United States Patent
Maeda et al.

(10) Patent No.: US 8,402,231 B2
(45) Date of Patent: Mar. 19, 2013

(54) STORAGE DEVICE, METHOD FOR RESTORING DATA IN STORAGE DEVICE AND STORAGE CONTROLLER

(75) Inventors: Chikashi Maeda, Kawasaki (JP); Hidejirou Daikokuya, Kawasaki (JP); Kazuhiko Ikeuchi, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 13/016,520

(22) Filed: Jan. 28, 2011

(65) Prior Publication Data

US 2011/0191538 A1 Aug. 4, 2011

(30) Foreign Application Priority Data

Feb. 4, 2010 (JP) ................. 2010-023552

(51) Int. Cl.
*G06F 13/00* (2006.01)
(52) U.S. Cl. .......................... 711/154; 711/114; 711/156
(58) Field of Classification Search .................. 711/114, 711/154, 156
See application file for complete search history.

(56) References Cited

U.S. PATENT DOCUMENTS

2008/0177994 A1* 7/2008 Mayer ............................... 713/2
2009/0125680 A1 5/2009 Ninose et al.

FOREIGN PATENT DOCUMENTS

JP 2002-222063 A 8/2002
JP 2009-116783 A 5/2009

* cited by examiner

*Primary Examiner* — Reba I Elmore
(74) *Attorney, Agent, or Firm* — Fujitsu Patent Center

(57) ABSTRACT

A virtual volume control unit allocates, upon detection of a write request for new data in a virtual volume to be accessed, an actual storage space of a physical medium existing in the same storage group to the virtual volume in accordance with volume capacity of the new data. A storage control unit stores the new data as actual data in the actual storage space of the physical medium allocated to the virtual volume. And a restoration control unit causes, upon detection of a fallback in data redundancy in the storage group, the actual data in a stored space among the actual storage spaces in the physical medium that caused the fallback to be preferentially restored in an actual storage space in a destination physical medium with reference to the physical media other than the physical medium that caused the fallback in the storage group.

10 Claims, 12 Drawing Sheets

| 52A | RAID GROUP NUMBER | RAID GROUP NUMBER |
|---|---|---|
| 52B | GROUP STATUS | CURRENT STATUS OF RAID GROUP |
| 52C | STRIPE DEPTH | NUMBER OF BLOCKS INCLUDED IN 1 DEPTH |
| 52D | STRIPE SIZE | NUMBER OF BLOCKS INCLUDED IN 1 STRIPE |
| 52E | MEMBER DISK [0] | DISK NUMBER WHICH CONSTITUTES RAID GROUP: 0 |
| 52E | MEMBER DISK [1] | DISK NUMBER WHICH CONSTITUTES RAID GROUP: 1 |
| | : | : |
| 52E | MEMBER DISK [n] | DISK NUMBER WHICH CONSTITUTES RAID GROUP: n |

FIG. 6

| 53A | DISK NUMBER | DISK NUMBER |
|---|---|---|
| 53B | DISK STATUS | CURRENT DISK STATUS |
| 53C | GROUP NUMBER | RAID GROUP NUMBER TO WHICH DISK BELONGS |
| 53D | REBUILDING PROGRESS ADDRESS | PROGRESS ADDRESS DURING REBUILD PROCESS OF DISK |

| 54A | RAID GROUP NUMBER | RAID GROUP NUMBER WITHIN DEVICE |
|---|---|---|
| 54B | NEWLY SET FLAG | ON/OFF |
| 54C | ENTRY UNIT DEPTH | MAXIMUM DEPTH FOR EACH ENTRY |
| 54D | ELEMENT [0] TO BE REBUILT | ELEMENTS OF ENTRY NUMBERS OF 0TH TO 15TH |
| | ⋮ | ⋮ |
| 54D | ELEMENT [n] TO BE REBUILT | ELEMENTS OF ENTRY NUMBERS OF (16 × n)TH TO (16 × (n + 15))TH |

STORAGE DEVICE, METHOD FOR RESTORING DATA IN STORAGE DEVICE AND STORAGE CONTROLLER

CROSS-REFERENCE TO RELATED APPLICATION

This application is based upon and claims the benefit of priority of the prior Japanese Patent Application No. 2010-23552, filed on Feb. 4, 2010, the entire contents of which are incorporated herein by reference.

FIELD

The present invention relates to a storage device, a method for restoring data in the storage device and a storage controller.

BACKGROUND

Disk array devices, such as for example, a RAID (Redundant Arrays of Inexpensive Disk) set, have become popular. The RAID storage unit secures data reliability as an entire system with a data redundancy configuration established among disks in a RAID group consisting of a plurality of the disks (see, for example, Japanese Laid-open Patent Publication No. 2002-222063 and No. 2009-116783).

Even if a failure occurs in some disks in the RAID group and a fallback occurs in the data redundancy of the RAID group, the RAID storage unit can cause the data content stored in the failed disk(s) to be restored in a destination disk, such as a spare disk and a replaced normal disk. A widely used restoration process is, for example, a data reconstruction process (hereinafter, referred to as a "rebuild process").

Thus, even if a failure occurs in some disks and a fallback occurs in the data redundancy in the RAID group, the RAID storage unit can recover the redundancy through the rebuild process to cause the data content in the failed disk to be restored in the destination disk.

In particular, in the rebuild process, the data content stored in the failed disk is sequentially restored from the first block to the last block of the actual storage space with reference to the failed disk and disks other than the failed disk in the RAID group.

In the rebuild process, the data content of the failed disk can be reconstructed and restored in the destination disk by sequentially storing the restored data in the actual storage space in the destination disk.

Upon detection of a write request issued by a host for new data with respect to a virtual volume to be accessed, the RAID storage unit allocates, as the virtual volume, a logical volume corresponding to an actual storage space of the disk which exists in the same RAID group in accordance with the volume capacity of the new data.

The virtual volume is not allocated from the actual storage space during creation of the logical volume recognized by the host, but allocated sequentially from the actual storage space corresponding to a range of an I/O request upon detection of an I/O request of a write request issued by the host. The RAID storage unit causes the new data of the write request to be stored as the actual data in the actual storage space of the disk corresponding to the logical storage space allocated to the virtual volume.

FIG. 14 illustrates a relationship between a logical storage space and an actual storage space of the RAID groups when a virtual volume is used.

The virtual volume randomly includes, in the actual storage space in the RAID group, stored spaces in which the actual data is stored and spaces in which no actual data is stored (i.e., a zero data space).

In a rebuild process for a virtual volume in related art RAID storage units, data in the actual storage space of the failed disk is sequentially restored from the first block to the last block and the restored data is reconstructed in the actual storage space in the destination disk. Thus, in the related art RAID storage units, since the data content stored in the actual storage space of the failed disk is caused to be restored in the actual storage space of the destination disk, the data redundancy in the RAID group can be recovered.

In such related art RAID storage units, data in the first block to the last block of the destination disk is uniformly reconstructed irrespective of the concept of the stored space in which the actual data has been stored and the space in which no data is stored in the actual storage space of the failed disk. Recently, disks with increasingly larger storage capacity are being developed.

The related art RAID storage units require significantly long time to restore data uniformly and sequentially from the first block to the last block in the disk of large capacity and reconstructs the data content in the destination disk. It therefore takes long time to recover data redundancy in the RAID group.

SUMMARY

The disclosed technique is developed in view of the aforementioned circumstances, and an object thereof is to provide a storage device capable of significantly shortening time required to recover data redundancy even if a fallback occurs in data redundancy in a storage group.

A storage device according to the present application includes, in one aspect thereof, a plurality of physical media having actual storage spaces in each of which data is stored; a group control unit which creates a plurality of storage groups using the plurality of physical media; a virtual volume control unit which, upon detection of a write request for new data in a virtual volume to be accessed, allocates an actual storage space of a physical medium existing in the storage groups to the virtual volume in accordance with volume capacity of the new data; a storage control unit which causes the new data to be stored as actual data in the actual storage space of the physical medium allocated to the virtual volume by the virtual volume control unit and secures redundancy of the actual data with respect to the physical medium in the storage groups; and a restoration control unit which performs, upon detection of a fallback of redundancy with respect to the physical medium in the storage groups, a restoration process with reference to physical media other than the physical medium that caused the fallback in the storage group to which the physical medium that caused the fallback belongs such that the actual data in a stored space is preferentially restored in the actual storage space in the destination physical medium among the actual storage spaces in the physical medium that caused the fallback.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates exemplary block addresses of disks in a disk group.

FIG. 5 illustrates content of a RAID management table.

FIG. 6 illustrates content of a disk management table.

DESCRIPTION OF EMBODIMENTS

Hereinafter, embodiments of a storage device, a method for restoring data of the storage device and a storage controller according to the present application will be described in detail with reference to the drawings. The disclosed embodiments are illustrative and not restrictive.

[a] First Embodiment

Figure 1:
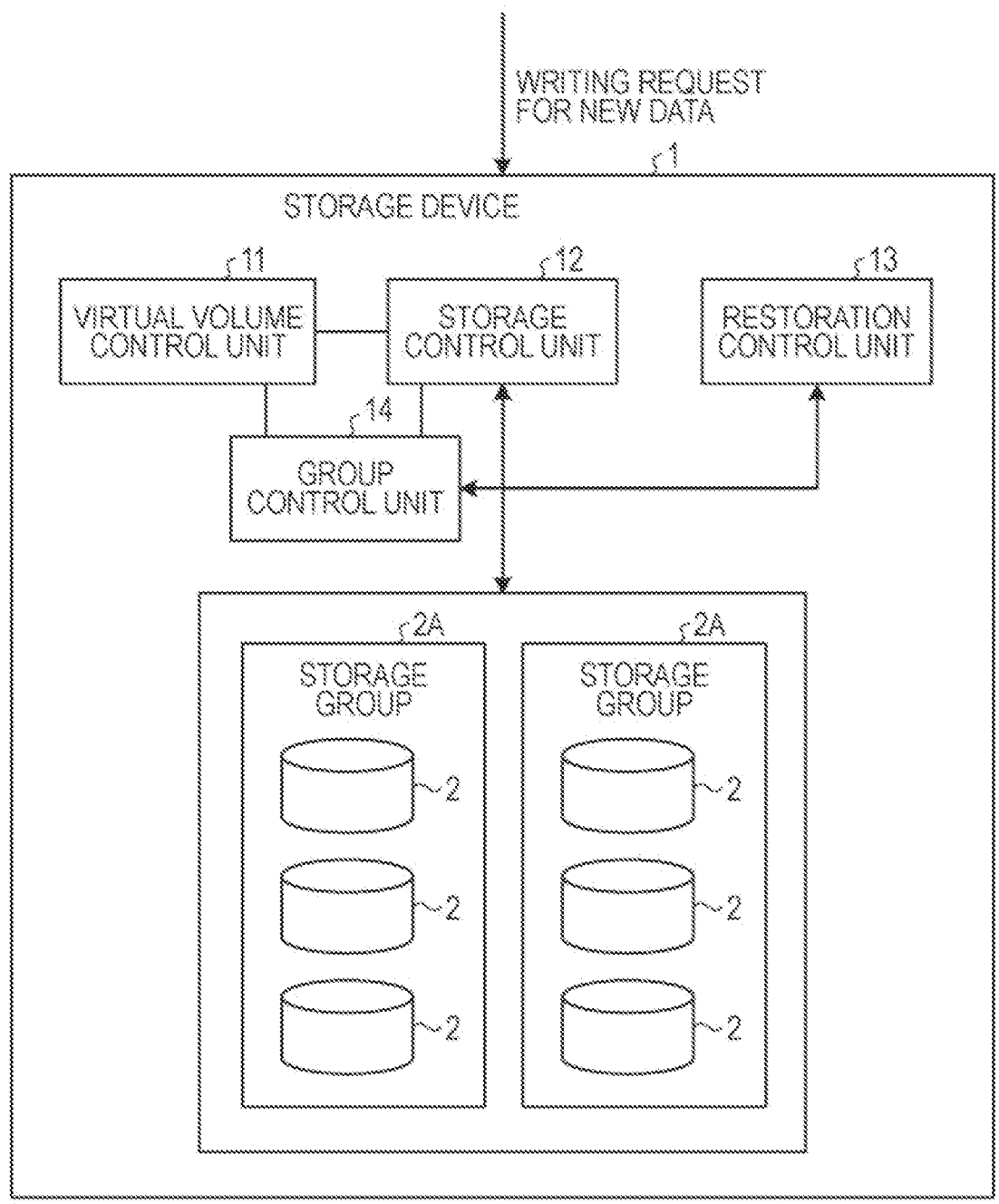
FIG. 1 is a block diagram of a configuration of a storage device according to a first embodiment.

FIG. 1 is a block diagram of a configuration of a storage device according to a first embodiment. A storage device 1 illustrated in FIG. 1 includes physical media 2, a group control unit 14, a virtual volume control unit 11, a storage control unit 12 and a restoration control unit 13. Data is stored in the physical media 2.

The virtual volume control unit 11 detects a write request for new data with respect to a virtual volume which is to be accessed. The group control unit 14 creates a plurality of storage groups 2A each of which is constituted by a plurality of physical media 2.

The virtual volume control unit 11 allocates, upon detection of a write request for new data, a certain actual storage space of a certain physical medium 2 existing in a certain storage group 2A as a virtual volume in accordance with volume capacity of the new data among the storage groups 2A, each of which is constituted by a plurality of physical media 2.

The storage control unit 12 causes the new data to be stored as actual data in the actual storage space of the physical medium 2 which is allocated as the virtual volume by the virtual volume control unit 11.

The storage control unit 12 secures redundancy of the actual data with respect to the physical medium 2 in the storage group 2A.

The restoration control unit 13 determines whether there is any fallback in the data redundancy in the storage group 2A.

If any fallback in the data redundancy is detected, the restoration control unit 13 selects another physical medium 2 other than the physical medium 2 that caused the fallback within the storage group 2A to which the physical medium 2 that caused the fallback belongs.

The restoration control unit 13 also performs, with reference to the selected another physical medium 2, a restoration process such that the actual data in a stored space among the actual storage spaces of the physical medium 2 that caused the fallback is preferentially restored in an actual storage space of the destination physical medium 2 that caused the fallback.

In the first embodiment, when a fallback in the data redundancy in the storage group 2A is detected, the actual data in the stored space among the actual storage spaces of the physical medium 2 that caused the fallback is preferentially restored in an actual storage space of the destination physical medium 2 with reference to the another physical medium 2 in the storage group 2A to which the physical medium 2 that caused the fallback belongs. With this configuration, even if any fallback in the data redundancy is detected, processing time required for the recovery of the redundancy is shortened significantly and data reliability in the storage group can be recovered in the first embodiment.

[b] Second Embodiment

Next, a RAID storage unit according to a second embodiment will be described in detail.

Figure 2:
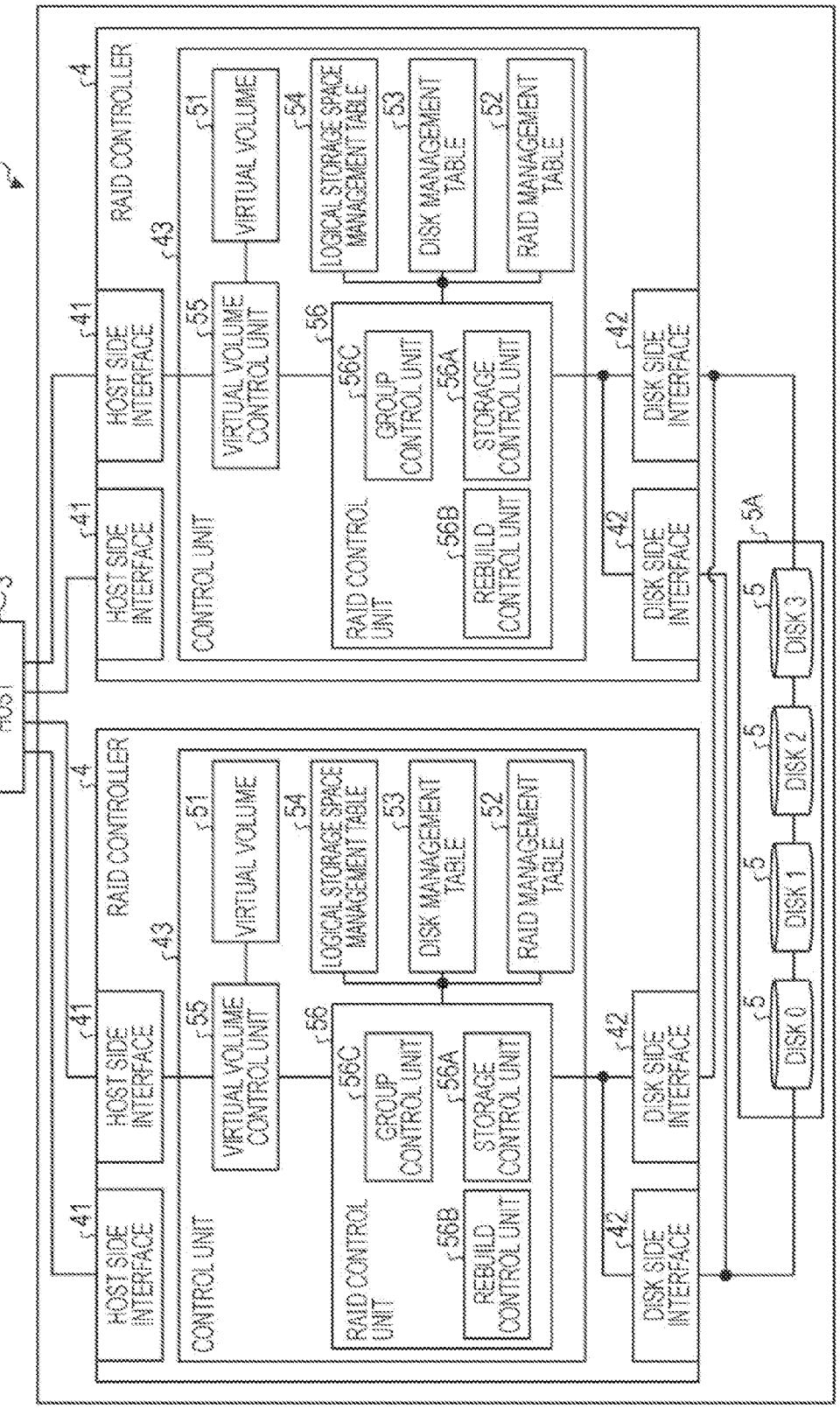
FIG. 2 is a block diagram of a configuration of a RAID storage unit according to a second embodiment.

FIG. 2 is a block diagram of a configuration of a RAID storage unit according to the second embodiment. A RAID storage unit 1A illustrated in FIG. 2 is connected to a host 3 and includes RAID controllers 4 and a disk group 5A. The host 3 is connected to the RAID controller 4 and sends an I/O request to the RAID controllers 4.

Figure 3:
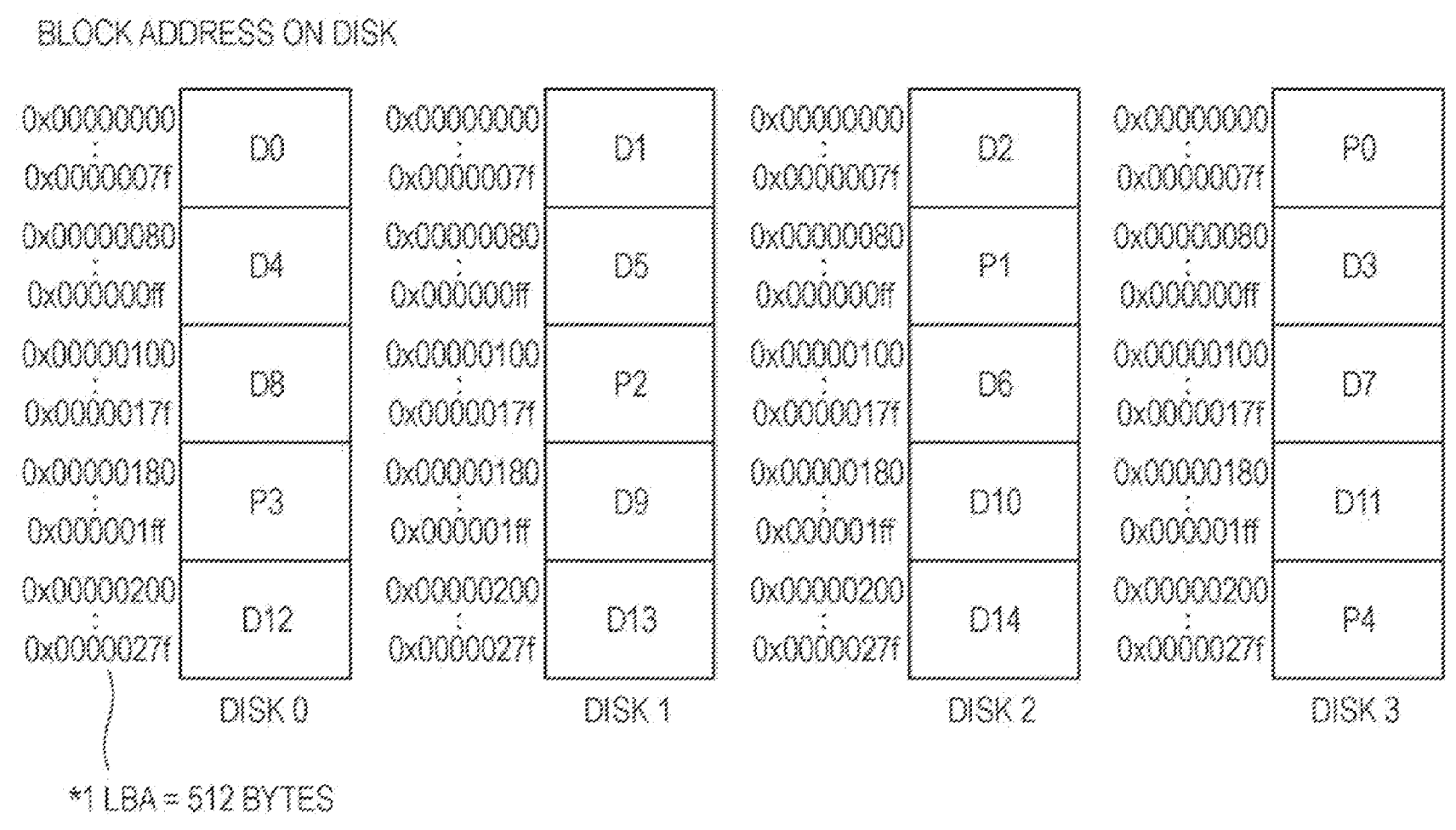
Figure 4:
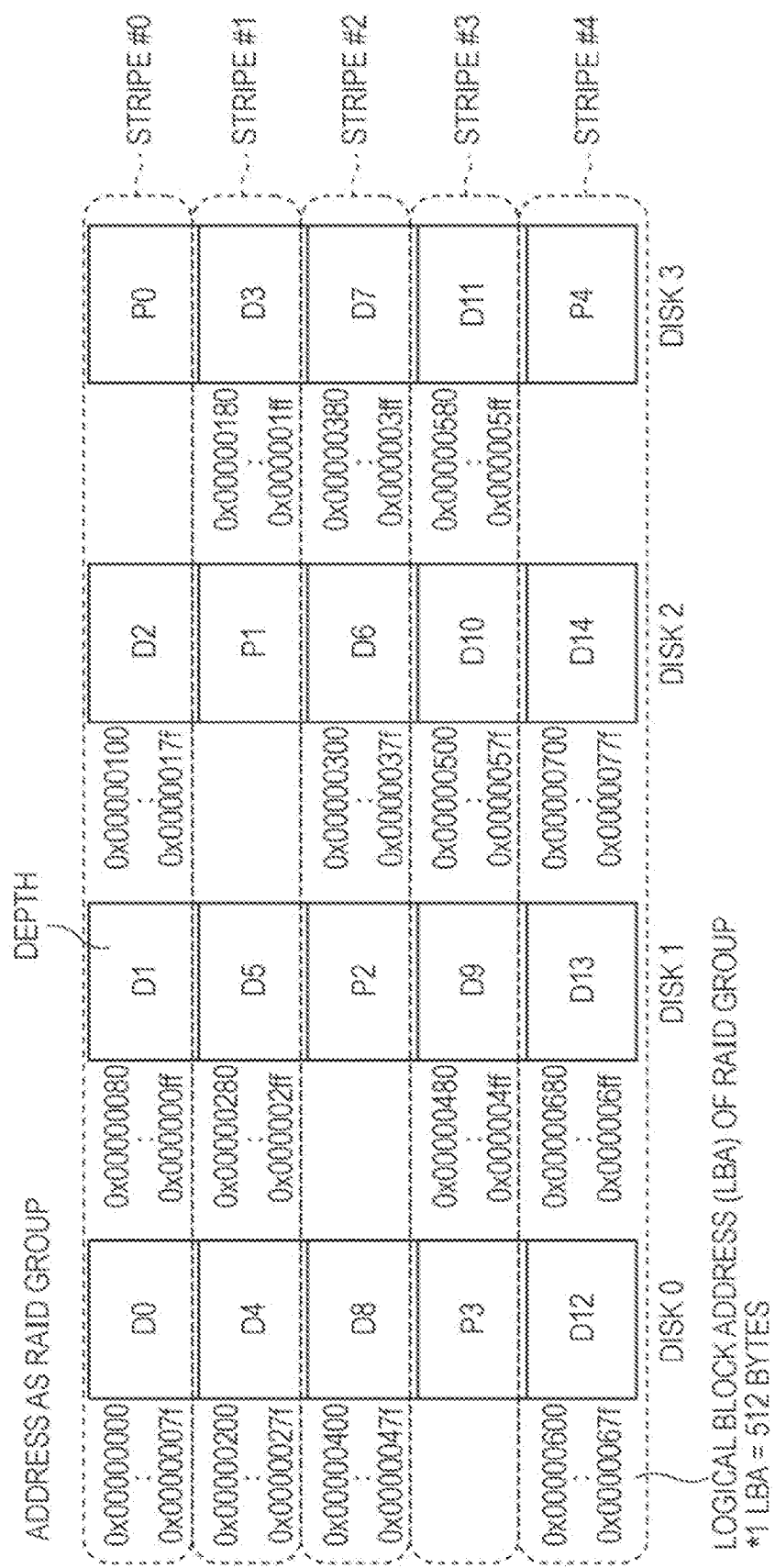
FIG. 4 illustrates exemplary block addresses of RAID groups in the disk group.

The disk group 5A, constituted by a plurality of RAID groups including a plurality of the disks 5, is connected to the RAID controller 4. FIG. 3 illustrates exemplary block addresses of disks in the disk group 5A. FIG. 4 illustrates exemplary block addresses of RAID groups in the disk group 5A.

The disk group 5A is constituted by, for example, four disks 5 (DISK0 to DISK3). The disk 5 (DISK0) illustrated in FIG. 3 is constituted by, for example, actual storage spaces of a first block address 0x00000000 to a last block address 0x0000027f.

The disk 5 (DISK0) sequentially stores, from a first block, user data D0, D4, D8, parity data P3 and user data D12.

The disk 5 (DISK1) is constituted by actual storage spaces of the first block address 0x00000000 to the last block address 0x0000027f.

The disk 5 (DISK1) sequentially stores, from the first block, user data D1, D5, parity data P2 and user data D9 and D13.

The disk 5 (DISK2) is constituted by, for example, actual storage spaces of the first block address 0x00000000 to the last block address 0x0000027f.

The disk 5 (DISK2) sequentially stores, from the first block, user data D2, parity data P1 and user data D6, D10 and D14.

The disk 5 (DISK3) is constituted by, for example, actual storage spaces of the first block address 0x00000000 to the last block address 0x0000027f.

The disk 5 (DISK3) sequentially stores, from the first block, parity data P0, user data D3, D7, D11 and parity data P4.

As illustrated in FIG. 4, the disk group 5A is constituted by a plurality of RAID groups. The disks 5 (DISK0 to DISK3) are partially striped together. Stripe #0 is constituted by D0, D1, D2 and P0; stripe #1 is constituted by D3, D4, D5 and P1; stripe #2 is constituted by D6, D7, D8 and P2; stripe #3 is constituted by D9, D10, D11 and P3; and stripe #4 is constituted by D12, D13, D14 and P4.

Note that the block addresses of the RAID groups are different from those of the disks.

Each of the RAID controllers 4 includes host side interfaces 41, disk side interfaces 42 and a control unit 43.

The host side interfaces 41 are communication interfaces which communicate with the host 3.

The disk side interfaces 42 are communication interfaces which communicate with the disk group 5A.

The control unit 43 controls the entire RAID controller 4. The control unit 43 includes a virtual volume 51, a RAID management table 52, a disk management table 53, a logical storage space management table 54, a virtual volume control unit 55 and a RAID control unit 56.

The RAID management table 52 manages content of the RAID groups. The disk management table 53 manages content of the disks. The logical storage space management table 54 manages, in a bit map format, statuses, such as an allocation status and a restoration status, of each predetermined management unit in the actual storage space of the RAID groups. The predetermined management unit represents, for example, a 32 megabyte process area divided from the actual storage space.

FIG. 5 illustrates content of the RAID management table 52.

The RAID management table 52 illustrated in FIG. 5 manages a RAID group number 52A, a group status 52B, a stripe depth 52C, a stripe size 52D and member disks 52E.

The RAID group number 52A represents a group number for the identification of the RAID group. The group status 52B represents the status of the RAID group and represents various statuses, such as "rebuild in fallback state," "rebuild with only actual data recovered" and "normal." The stripe depth 52C represents the number of blocks included in a unit depth in the RAID group.

For example, in stripe #1 illustrated in FIG. 4, the stripe depth 52C represents the number of blocks included in D4. The stripe size 52D represents the number of blocks included in each stripe.

For example, in stripe #1 illustrated in FIG. 4, the stripe size 52D represents the number of all the blocks of D3, D4, D5 and P1. The member disks 52E represent the disk numbers for the identification of the disks 5 which belong to the RAID group.

FIG. 6 illustrates content of the disk management table 53.

The disk management table 53 illustrated in FIG. 6 manages a disk number 53A, a disk status 53B, a number of RAID group to which the disk belongs 53C and a rebuilding progress address 53D.

The disk number 53A represents the number for the identification of the disk 5. The disk status 53B represents various statuses of the disk 5, such as "failed," "normal" and "being rebuilt." The number of RAID group to which the disk belongs 53C represents the RAID group number to which the disk 5 belongs. The rebuilding progress address 53D represents a progress address when the disk 5 is being rebuilt.

The rebuilding progress address 53D is herein managed by the block addresses in the actual storage space illustrated in FIG. 3.

Figures 7, 8:
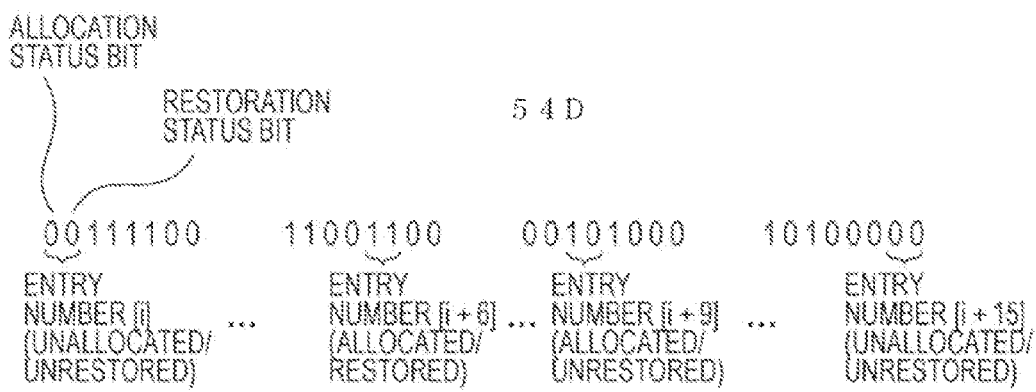
FIG. 7 illustrates content of a logical storage space management table.
FIG. 8 illustrates an exemplary element to be rebuilt.

FIG. 7 illustrates content of the logical storage space management table 54.

The logical storage space management table 54 illustrated in FIG. 7 manages a RAID group number 54A, a newly set flag 54B, an entry unit depth 54C and a plurality of elements to be rebuilt 54D. The newly set flag 54B is a flag representing whether there is an allocation of new data during the rebuild process.

The entry unit depth 54C represents the maximum depth for each entry number.

Note that the term "entry" is data representing whether the rebuild process should be performed for each management unit of the virtual volume.

The entry numbers are applied, in the predetermined management unit, sequentially from the first address to the last address of the actual storage space of the disk 5 in the RAID group.

The block addresses in the actual storage space of the disk 5 is converted into entry numbers in the following manner: first, the block addresses in the actual storage space illustrated in FIG. 3 are converted into the block addresses of the RAID groups illustrated in FIG. 4; and then, the block addresses of the RAID groups are divided into the predetermined management units to obtain the divided result as the entry numbers.

In this manner, the entry numbers can be converted from the block addresses of the actual storage space.

Conversely, the entry numbers are converted into the block addresses in the actual storage space of the disk 5 in the following manner: first, the entry numbers are multiplied by the predetermined management units to obtain the multiplication result as block addresses of the first stripe of the RAID group; and then, the block addresses of the RAID groups are converted into the block addresses of the actual storage space illustrated in FIG. 3.

In this manner, the entry numbers can be converted into the block address of the actual storage space.

Each of the elements to be rebuilt 54D is constituted by, for example, a total of 16 successive elements corresponding to 16 entries. Each element represents the entry number for the identification of the space corresponding to the predetermined management unit in the actual storage space and the allocation status and the restoration status of the space.

Each element is constituted by 4 bytes.

Each of the elements to be rebuilt 54D includes 16 elements with the entry numbers of from 0 to 15.

Each of the elements to be rebuilt 54D includes 16 elements with the entry numbers of from 16xn to 16xn+15.

FIG. 8 illustrates an exemplary element to be rebuilt 54D.

In the element to be rebuilt 54D illustrated in FIG. 8, each entry is constituted by 8 bits, among which 1 bit is allocated as an allocation status bit and 1 bit is allocated to a restoration status bit.

The allocation status bit represents whether the actual storage space storing actual data has been allocated to a virtual volume. The allocation status bit is set to on, i.e., to 1 if the allocation is completed and is set to off, i.e., to 0 if the allocation is not completed.

The restoration status bit represents whether the actual data stored in the actual storage space has been restored during a rebuild process. The restoration status bit is set to on, i.e., to 1 if the restoration is completed and is set to off, i.e., 0 if the restoration is not completed.

If RAID 5 (15+1) is constituted by 16 1-terabyte disks, for example, the logical storage space management table 54 allocates each 2 bits as the allocation status bit and the restoration status bit of each of the entries in the logical storage space management table 54.

In this manner, the necessary size of the logical storage space management table 54 can be about $((1 \times 1024 \times 1024)(MB)/(32/15)(MB)) \times 2/8 = 122880$ (bytes)=120 (KB).

The virtual volume control unit 55 detects a write request for new data to be written in a virtual volume 51 to be accessed by the host 3.

The virtual volume control unit 55 allocates, upon detection of a write request for new data, a certain logical storage space corresponding to the actual storage space of the disk 5 existing in the same RAID group among the RAID groups as a virtual volume 51 in accordance with volume capacity of the new data.

The RAID control unit 56 includes a storage control unit 56A and a rebuild control unit 56B.

The storage control unit 56A stores new data for which the write request was issued as the actual data in the actual storage space of the disk 5 corresponding to the logical storage space allocated to the virtual volume 51.

Upon detection of a fault in a disk 5 in the RAID group, the rebuild control unit 56B causes the actual data in the stored space among the actual storage spaces of the failed disk 5 to be restored with reference to the content of the disks 5 other than the failed disk 5 in the RAID group to which the failed disk 5 belongs.

The rebuild control unit 56B preferentially reconstructs, in the actual storage space in the destination disk 5, the actual data in the stored space among the actual storage spaces of the restored failed disk 5.

The destination disk 5 is, for example, a spare disk and a replaced normal disk.

Details of the process to preferentially reconstruct the actual data will be described later.

When the rebuild process for the actual data to cause the actual data in the failed disk 5 to be reconstructed in the actual storage space in the destination disk 5 is started, the RAID control unit 56 changes the status of the RAID group to "rebuild in fallback state."

The RAID control unit 56 sets the status of the group status 52B in the RAID management table 52 to "rebuild in fallback state."

With this, the RAID control unit 56 will sequentially cause the actual data in the failed destination disk 5 in the actual storage space of the destination disk 5.

When the rebuild process for the actual data to cause the actual data to be reconstructed in the actual storage space in the destination disk 5 is completed, the RAID control unit 56 changes the status of the RAID group to "rebuild with only actual data recovered."

The RAID control unit 56 sets the status of the group status 52B in the RAID management table 52 to "rebuild with only actual data recovered."

With this, the RAID control unit 56 had preferentially restored the actual data in the failed disk 5 in the actual storage space of the destination disk 5.

The RAID control unit 56 changes the status of the RAID group to "normal" after the rebuild process of the actual data is completed and a zero guarantee rebuild process to reconstruct initial data, e.g., a zero data space, in the failed disk 5, in the actual storage space in the destination disk 5 is completed.

The RAID control unit 56 sets the status of the group status 52B in the RAID management table 52 to "normal."

With this, the RAID control unit 56 had caused the actual data and the zero data space in the failed destination disk 5 in the actual storage space of the destination disk 5.

If new data is written in a space of an address subsequent to the actual storage space which is currently being restored in response to a write request for new data during the rebuild process of the actual data, the RAID control unit 56 keeps the status of the RAID group to "rebuild in fallback state."

The address subsequent to the actual storage space which is currently being restored is an address subsequent to a space which is not yet restored.

Thus, the RAID control unit 56 will cause the actual data including the new data to be restored in the actual storage space of the destination disk 5, even if new data is written during the rebuild process of the actual data.

When new data is written in a space of an address preceding the actual storage space which is currently being restored in response to the write request for new data during the rebuild process of the actual data, the RAID control unit 56 performs the rebuild process of the new data after the ongoing rebuild process of the actual data is completed.

The time "after the ongoing rebuild process of the actual data is completed" corresponds to time after the rebuild process from the first entry to the last entry recognized upon starting is completed.

Thus, the RAID control unit 56 will cause the actual data including the new data to be restored in the actual storage space of the destination disk 5, even if new data is written during the rebuild process of the actual data.

When new data is written in the disk 5 in response to the write request for new data during the zero guarantee rebuild process, the RAID control unit 56 suspends the zero guarantee rebuild process and changes the status of the RAID group to "rebuild in fallback state."

In response to the status change to "rebuild in fallback state," the RAID control unit 56 suspends the zero guarantee rebuild process and starts the rebuild process of new data.

Thus, the RAID control unit 56 reconstructs new data in the actual storage space of the destination disk 5 in response to the rebuild process of new data. With this, the RAID control unit 56 will cause the actual data including new data to be restored in the actual storage space of the destination disk 5, even if new data is written during the zero guarantee rebuild process.

After the reconstruction of the actual data to destination disk 5 is completed, the rebuild control unit 56B causes the zero data space of the space in which no data is stored among the actual storage space of the failed disk 5 to be reconstructed in the actual storage space of the destination disk 5.

The RAID control unit 56 causes the data sequentially restored from the disks 5 other than the failed disk 5 during the rebuild process to be managed in the disk management table 53 as a progress address 53D with the block addresses of the actual storage space.

Next, an operation of the RAID storage unit 1A according to the second embodiment will be described.

Figure 9:
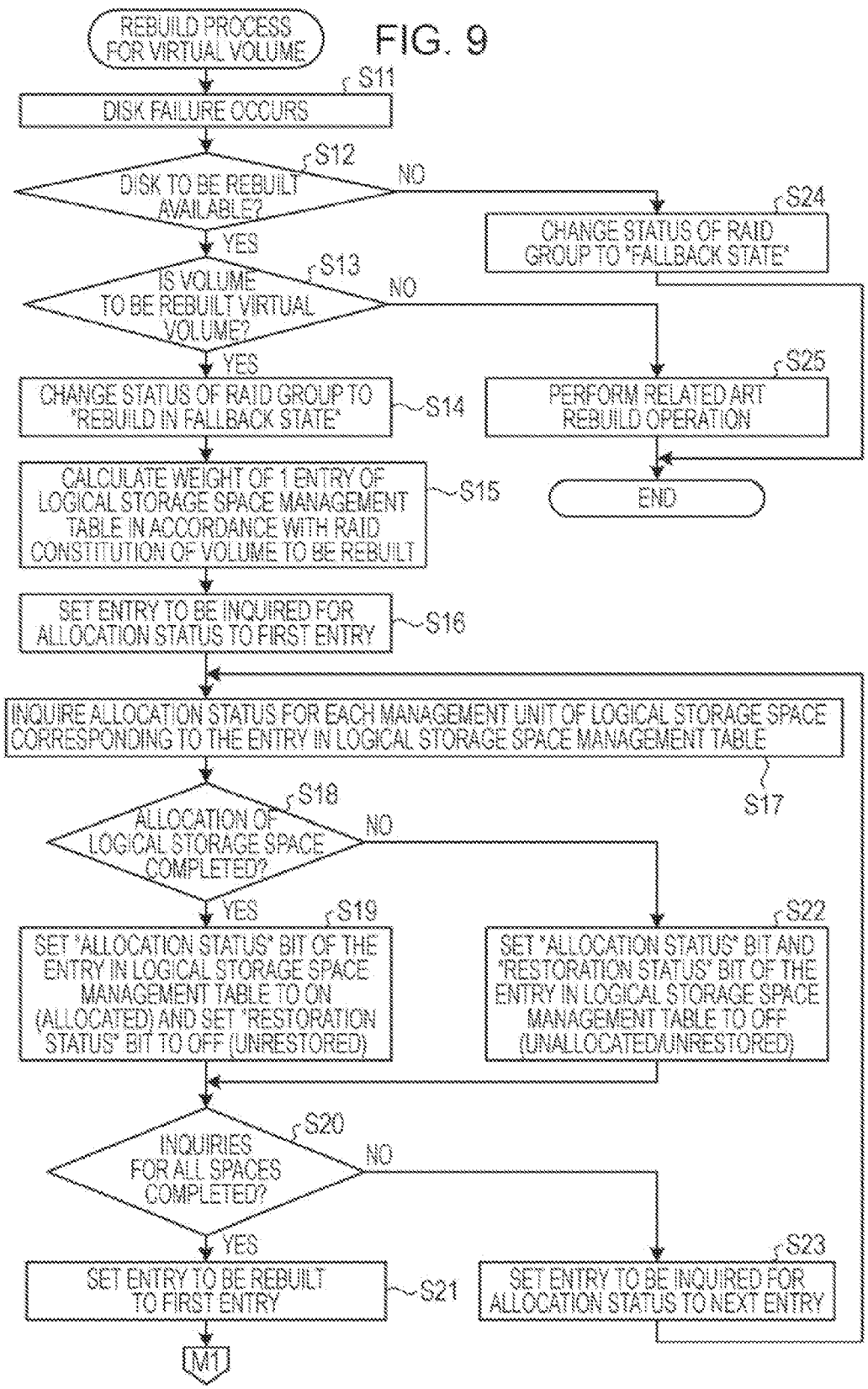
FIG. 9 is a flowchart of an operation of a RAID controller relating to a rebuild process of a virtual volume.
Figure 10:
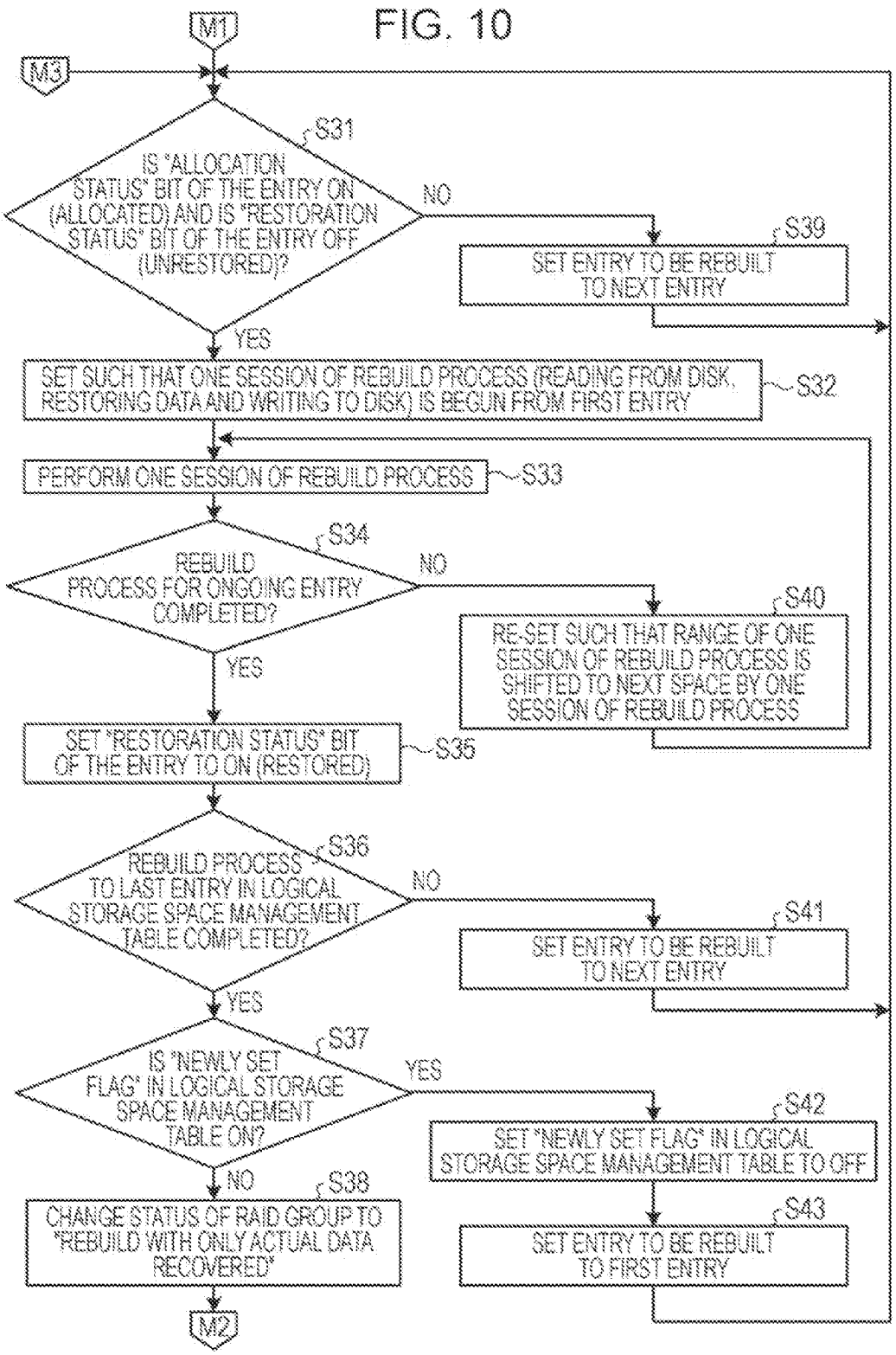
FIG. 10 is a flowchart of the operation of the RAID controller relating to the rebuild process of the virtual volume.
Figure 11:
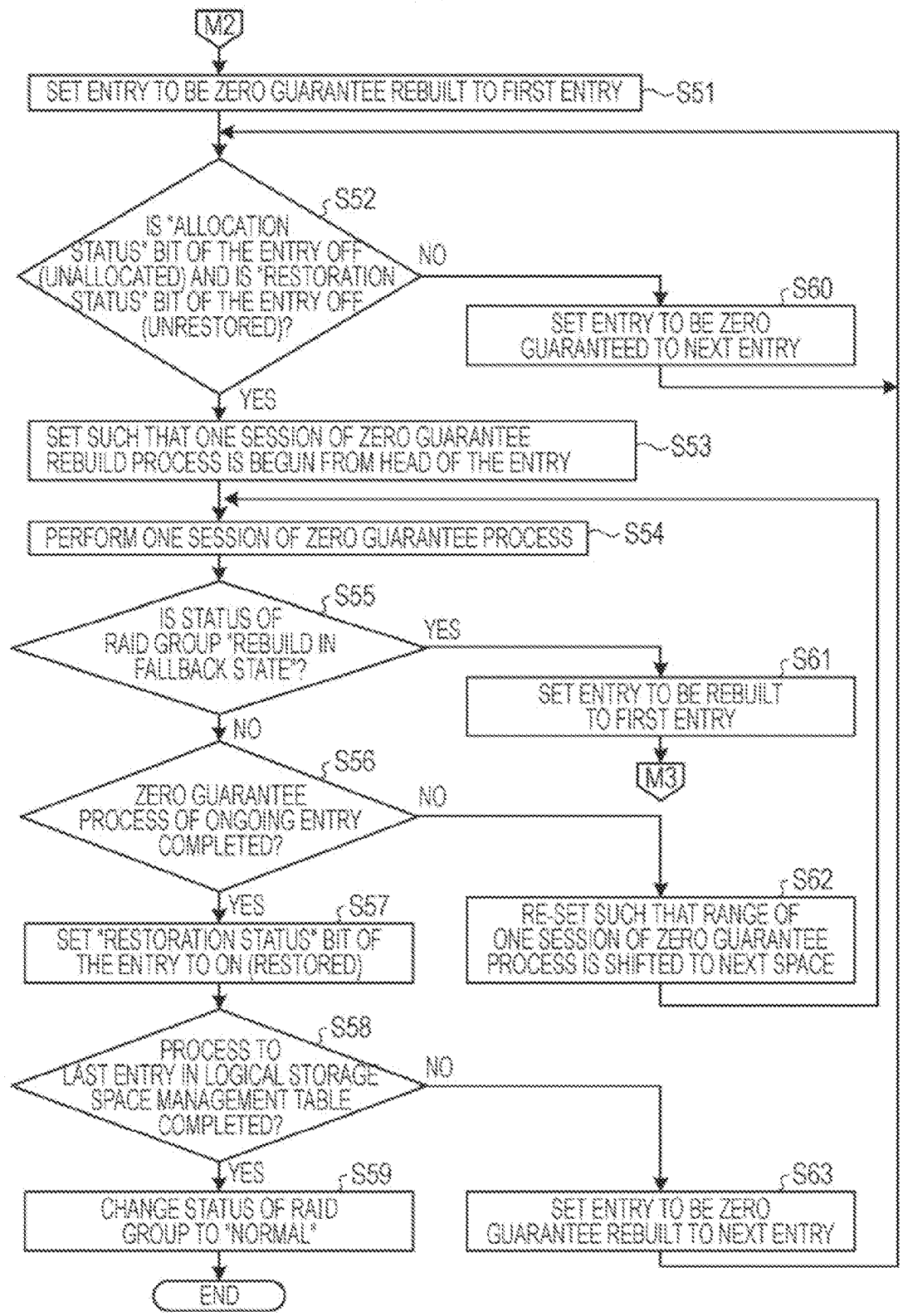
FIG. 11 is a flowchart of the operation of the RAID controller relating to the rebuild process of the virtual volume.

FIGS. 9 to 11 are flowcharts of the operation of the RAID controller 4 relating to the rebuild process of the virtual volume.

When a fallback occurs in the data redundancy upon, for example, a disk failure in the RAID group, the rebuild process of the virtual volume is performed to recover the fallback.

The term "fallback in the data redundancy" herein refers to a state in which reliability in redundancy is reduced due to failed redundancy disk(s) 5 in the RAID group.

Upon detection of a failure in the disk 5 existing in the RAID group (step S11), the control unit 43 in the RAID controller 4 illustrated in FIG. 9 determines whether a disk 5 to be rebuilt is available (step S12).

The disk 5 to be rebuilt corresponds to a destination disk, such as a spare disk which replaces the failed disk 5, or a replaced normal disk.

If the determination result in step S12 is YES, the control unit 43 determines whether the volume to be rebuilt is a virtual volume (step S13).

The control unit 43 makes the determination in step S13 with reference to the content of an un-illustrated table which manages whether each volume in the RAID group is a virtual volume.

If the determination result in step S13 is YES, the control unit 43 sets the status of the RAID group to "rebuild in fallback state" (step S14).

When the control unit 43 sets the status of the RAID group to "rebuild in fallback state, the status of the group status 52B corresponding to that RAID group in the RAID management table 52 is set to "rebuild in fallback state."

The control unit 43 calculates the weight of each entry in the logical storage space management table 54 in accordance with a RAID constitution of the volume to be rebuilt (step S15).

The weight of each entry corresponds to the weight which adjusts capacity of a management unit allocated to each disk in accordance with the RAID constitution, e.g., the number of disks in the RAID group.

The weight is calculated, for example, in the following manner; assuming that the number of disks in the RAID group is four and the management unit of the virtual volume is 32 MB, then capacity for each entry is 32 MB/4=8 MB.

For ease of description, parity is not considered in the above calculation; parity, of course, should be considered in the calculation regarding the RAID 5.

The RAID control unit 56 in the control unit 43 sets the entry number for which the allocation status is to be inquired to the first entry number in the logical storage space management table 54 (step S16), and then inquires the allocation status of the logical storage space in the management unit corresponding to the entry number for which the allocation status is to be inquired (step S17).

The RAID control unit 56 determines whether the logical storage space regarding the entry number for which allocation status is to be inquired has been already allocated (step S18).

If the determination result in step S18 is YES, the RAID control unit 56 sets the allocation status bit of that entry number of the logical storage space management table 54 to on, which represents that allocation has been completed and sets the restoration status bit to off, which represents that allocation has not been completed yet (step S19).

The RAID control unit 56 then determines whether the inquiry for the allocation status with respect to all the logical storage spaces of that RAID group has been completed (step S20).

The RAID control unit 56 determines whether the inquiry for the allocation status with respect to all the logical storage spaces has been completed with reference to the content of an un-illustrated table which manages usage of the virtual volume.

If the determination result in step S20 is YES, the RAID control unit 56 sets the element to be rebuilt to the first entry number (step S21). The process is then continued to M1 illustrated in FIG. 10.

If the determination result in step S18 is NO, the RAID control unit 56 sets the allocation status bit and the restoration status bit of that entry number of in the logical storage space management table 54 to off (step S22).

The RAID control unit 56 sets the allocation status bit to off, which represents that allocation has not been completed yet, and sets the restoration status bit to off which represents that restoration has not been completed yet.

The process then proceeds to step S20 where the RAID control unit 56 determines whether the inquiry has been completed.

If the determination result in step S20 is NO, the RAID control unit 56 sets the entry for which the allocation status is to be inquired to the next entry number (step S23) and the process proceeds to step S17.

If the determination result in step S12 is NO, the control unit 43 changes the status of the RAID group to "fallback state" and completes the operation.

When the status of the RAID group to "fallback state," the control unit 43 sets the group status 52B corresponding to the RAID group in the RAID management table 52 to "fallback state."

If the determination result in step S13 is NO, the control unit 43 performs a related art rebuild process (step S25) and completes the operation.

In M1 illustrated in FIG. 10, the control unit 43, which set the entry to be rebuilt to the first entry number, determines whether the allocation status bit of the entry number is on and the restoration status bit is off (step S31).

If the determination result in step S31 is YES, the rebuild control unit 56B in the RAID control unit 56 sets such that one session of the rebuild process is begun from the first entry number (step S32).

The rebuild control unit 56B performs one session of the rebuild process (step S33).

The rebuild process reads actual data and parity in the disks 5 other than the failed disk 5 within the RAID group to which the failed disk 5 belongs.

In the rebuild process, the actual data to be rebuilt is restored with reference to the read actual data and parity and the restored actual data is stored in the actual storage space of the destination disk 5.

The rebuild control unit 56B determines whether the rebuild process for the actual storage space relating to the logical storage space of the ongoing entry number has been completed (step S34).

If the determination result in step S34 is YES, the rebuild control unit 56B sets the restoration status bit of this entry number to on, which represents that the restoration has been completed (step S35).

The RAID control unit 56 sets the restoration status bit for the corresponding entry number in the logical storage space management table 54 to on.

The rebuild control unit 56B determines whether the rebuild process for the actual storage spaces relating to the logical storage space to the last entry number in the logical storage space management table 54 has been completed (step S36).

If the determination result in step S36 is YES, the rebuild control unit 56B determines whether a newly set flag 54B in the logical storage space management table 54 is on (step S37).

If the determination result in step S37 is NO, the rebuild control unit 56B sets the status of the RAID group to "rebuild with only actual data recovered" (step S38) and the process proceeds to M2 illustrated in FIG. 11.

The RAID control unit 56 sets the group status 52B of the corresponding RAID group in the RAID management table 52 to "rebuild with only actual data recovered."

The RAID controller 4 recognizes that the data redundancy of the corresponding RAID group has been recovered.

If the determination result in step S31 is NO, the rebuild control unit 56B sets the entry to be rebuilt to the next entry number (step S39), and the process proceeds to step S31.

If the determination result in step S34 is NO, the rebuild control unit 56B re-sets such that a range of one session of the rebuild process is shifted to the next space by one session of the process (step S40) and the process proceeds to step S33 where the one session of the rebuild process to the re-set space is performed.

If the determination result in step S36 is NO, the rebuild control unit 56B sets the entry to be rebuilt to the next entry number (step S41), and the process proceeds to step S31.

If the determination result in step S37 is YES, the rebuild control unit 56B determines that new data is stored in the disk 5 during the rebuild process and sets the newly set flag 54B to off (step S42). The rebuild control unit 56B then sets the entry to be rebuilt to the first entry number (step S43), and the process proceeds to step S31 where the entry number of the logical storage space corresponding to the actual storage space in which the new data has been stored is retrieved from the logical storage space management table 54.

Upon acquisition of the entry number of the new data of which the allocation status bit is on and the restoration status bit is off, the rebuild control unit 56B finally reconstructs new actual data stored in the actual storage space during the rebuild process in the disk 5 to be rebuilt.

In M2 illustrated in FIG. 11, the rebuild control unit 56B, which set the status of the RAID group to "rebuild with only actual data recovered," sets an entry to be zero guarantee rebuilt to the first entry number (step S51).

After setting the entry to be zero guarantee rebuilt to the first entry number, the rebuild control unit 56B determines whether the allocation status bit of this entry number is off and the restoration status bit is off (step S52).

If the determination result in step S52 is YES, the rebuild control unit 56B sets such that one session of the zero guarantee rebuild process is begun from the head of the entry (step S53).

The rebuild control unit 56B performs one session of the zero guarantee rebuild process (step S54).

In the zero guarantee rebuild process, zero data and parity are read from spaces in which no data is stored of the disks 5 other than the failed disk 5 in the RAID group to which the failed disk 5 belongs. In the zero guarantee rebuilding process, the zero data to be rebuilt is restored with reference to the read zero data and parity and the restored zero data is stored in the actual storage space of the destination disk 5.

The rebuild control unit 56B determines whether the status of the RAID group is "rebuild in fallback state" (step S55).

If the determination result in step S55 is NO, the rebuild control unit 56B determines whether the zero guarantee rebuild process with respect to the actual storage space relating to the logical storage space of the ongoing entry number has been completed (step S56).

The rebuild control unit 56B sets the restoration status bit of this entry number to on, which represents that the restoration has been completed (step S57) and then determines whether the rebuild process with respect to the actual storage space relating to the logical storage space to the last entry number in the logical storage space management table 54 has been completed (step S58).

If the determination result in step S58 is YES, the rebuild control unit 56B changes the status of the RAID group to "normal" (step S59) and completes the operation.

The RAID control unit 56 sets the group status 52B corresponding to that RAID group in the RAID management table 52 to "normal."

If the determination result in step S52 is NO, the rebuild control unit 56B sets an entry to be zero guarantee rebuilt to the next entry number (step S60) and the process proceeds to step S52.

If the determination result in step S55 is YES, the rebuild control unit 56B determines that new data has been written during the zero guarantee rebuild process.

The rebuild control unit 56B sets the entry to be rebuilt to the first entry number (step S61) and the process proceeds to M3 illustrated in FIG. 10 where the entry number corresponding to the logical storage space relating to the actual storage space in which the new data has been stored is retrieved from the logical storage space management table 54.

If the determination result in step S56 is NO, the rebuild control unit 56B re-sets such that a range of one session of the zero guarantee rebuild process is shifted to the next space by one session of the process (step S62).

The process proceeds to step S54 where the rebuild control unit 56B performs one session of the zero guarantee rebuild process to the re-set space.

If the determination result in step S58 is NO, the rebuild control unit 56B sets the entry to be zero guarantee rebuilt to the next entry (step S63) and the process proceeds to step S52.

In the rebuild process of the virtual volume, when the actual data in the failed disk 5 is preferentially reconstructed in the disk 5 to be rebuilt, the status of the RAID group is changed to "rebuild with only actual data recovered."

Thus, the RAID group is recovered from the fallback state of redundancy.

In the rebuild process of the virtual volume, the actual data is reconstructed in the disk 5 to be rebuilt and the status is changed to "rebuild with only actual data recovered," and then the zero guarantee rebuild process to cause the zero data space in the failed disk 5 to be reconstructed in the disk 5 to be rebuilt is performed.

With this, restoration of the actual data and the zero data in the failed disk 5 is completed when the zero guarantee rebuild process is completed and the status of the RAID group is changed to "normal."

In the rebuild process of the virtual volume, the status of the RAID group is changed to "rebuild in fallback state" when, for example, the new data is written during the zero guarantee rebuild process.

In the rebuild process of the virtual volume, the entry number of the logical storage space relating to the actual storage space in which the new data has been stored is retrieved from the logical storage space management table 54.

With this, in the rebuild process of the virtual volume, the actual data of the new data can be reconstructed in the disk 5 to be rebuilt with reference to the entry number.

Next, a process to allocate new data during the rebuild process will be described.

Figure 12:
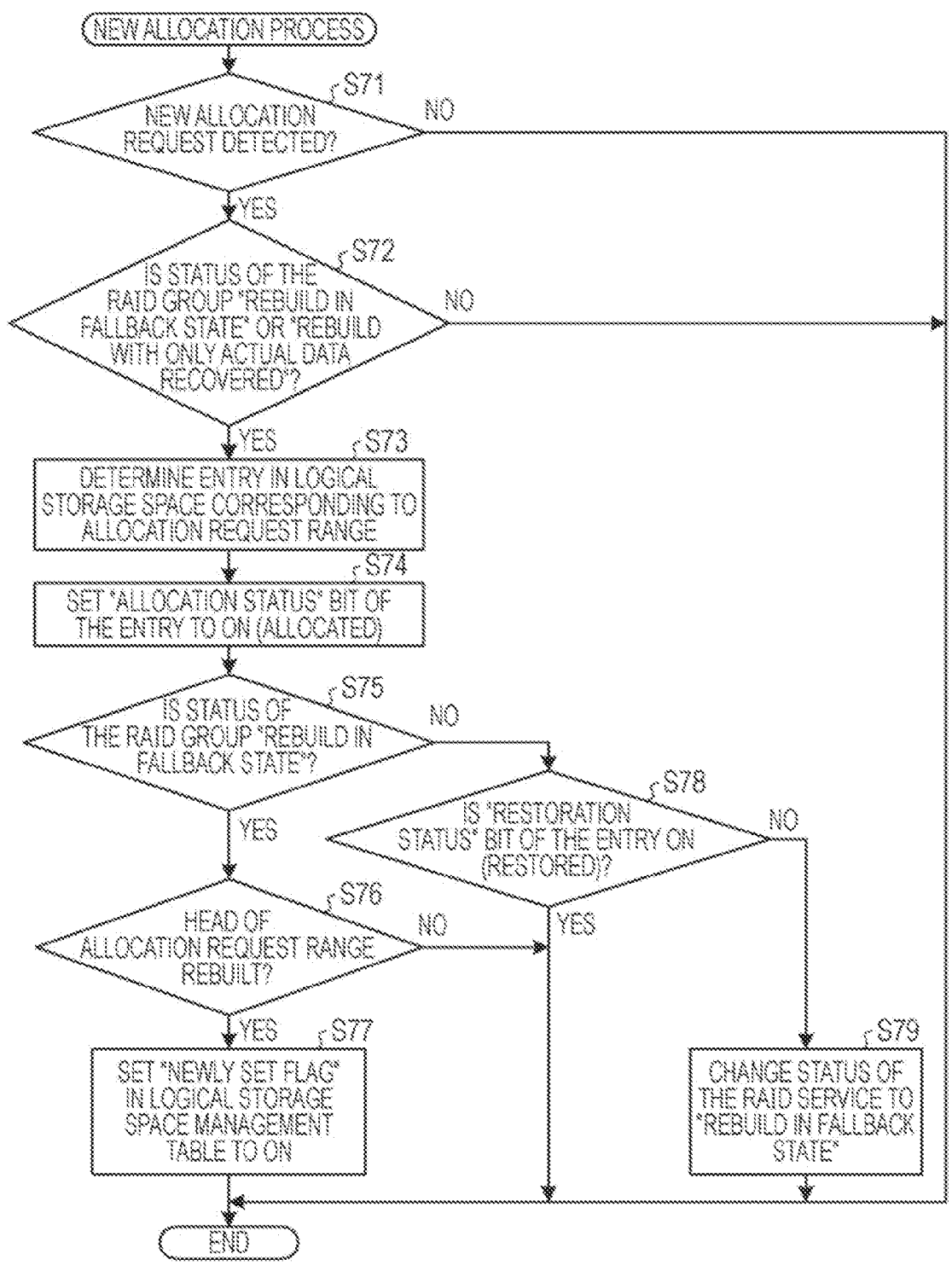
FIG. 12 is a flowchart of an operation of the RAID controller relating to a new allocation process.

FIG. 12 is a flowchart of an operation of the RAID controller 4 relating to a new allocation process.

In FIG. 12, the control unit 43 in the RAID controller 4 determines whether a new allocation request in response to the write request for new data has been detected (step S71).

If the determination result in step S71 is YES, the control unit 43 determines whether the status of the RAID group corresponding to the new data is "rebuild in fallback state" or "rebuild with only actual data recovered" (step S72).

If the determination result in step S72 is YES, the control unit 43 determines the entry number the corresponding to the logical storage space in a range of the allocation request of new data (step S73).

The control unit 43 sets the allocation status bit of the corresponding entry number in the logical storage space management table 54 to on (step S74) and determines whether the status of the corresponding RAID group is "rebuild in fallback state" (step S75).

If the determination result in step S75 is YES, the control unit 43 determines whether the actual storage space relating to the logical storage space of the head of the range of the allocation request of new data has been rebuilt (step S76).

If the determination result in step S76 is YES, the control unit 43 sets the newly set flag 54B in the logical storage space management table 54 to on (step S77) and completes the operation.

Since the newly set flag 54B is on (see step S37 of FIG. 10), the rebuild control unit 56B retrieves the entry number of the actual storage space in which the new data has been stored again from the logical storage space management table 54 after the ongoing rebuild process of the actual data is completed.

The rebuild control unit 56B sets the entry number as a result of retrieval and performs the rebuild process for the new data.

If the determination result in step S71 is NO, the control unit 43 completes the operation.

The control unit 43 also completes the operation when the status of the RAID group is neither "rebuild in fallback state" nor "rebuild with only actual data recovered."

If the determination result in step S75 is NO, the control unit 43 determines that the status of the corresponding RAID group is "rebuild with only actual data recovered" and determined that the zero guarantee is ongoing.

The control unit 43 then determines whether the restoration status bit of this entry number is on during the zero guarantee rebuild process (step S78).

If the determination result in step S78 is YES, the control unit 43 completes the operation.

If the determination result in step S78 is NO, the control unit 43 sets the status of the corresponding RAID group to "rebuild in fallback state" (step S79) and completes the operation.

When the status is set to "rebuild in fallback state" (see step S55 of FIG. 11), the rebuild control unit 56B suspends the zero guarantee rebuild process and retrieves the entry number of the actual storage space in which the new data has been stored from the logical storage space management table 54.

The rebuild control unit 56B sets the entry number as a result of retrieval and performs the rebuild process of the new data.

If the determination result in step S76 is NO, the control unit 43 completes the operation.

Since the status of the corresponding RAID group is "rebuild in fallback state," the rebuild control unit 56B performs the rebuild process for the new data with the ongoing rebuild process of the actual data.

In the new allocation process illustrated in FIG. 12, during the rebuild process of the actual data, if the actual storage space relating to the logical storage space of the head of the range of the allocation request of new data has been rebuilt, the rebuild process for the new data is performed again after the ongoing rebuild process for the actual data is completed.

As a result, in the new allocation process, the new data allocated during the rebuild process of the actual data can be restored in the actual storage space of the disk 5 to be rebuilt.

In the new allocation process, if the actual storage space relating to the logical storage space of the head of the range of the allocation request of new data has been rebuilt, the rebuild process for the new data is performed with the ongoing rebuild process for the actual data.

Thus, in the new allocation process, the new data allocated during the rebuild process of the actual data can be restored in the actual storage space of the disk 5 to be rebuilt.

When the new data is allocated during the zero guarantee rebuild process in the new allocation process, the ongoing zero guarantee rebuild process is suspended and the rebuild process of the new data is started.

Thus, in the new allocation process, the new data allocated during the zero guarantee rebuild process can be restored in the actual storage space of the disk 5 to be rebuilt.

Next, an operation of the RAID controller 4 corresponding to the I/O request from the host 3 will be described.

Figure 13:
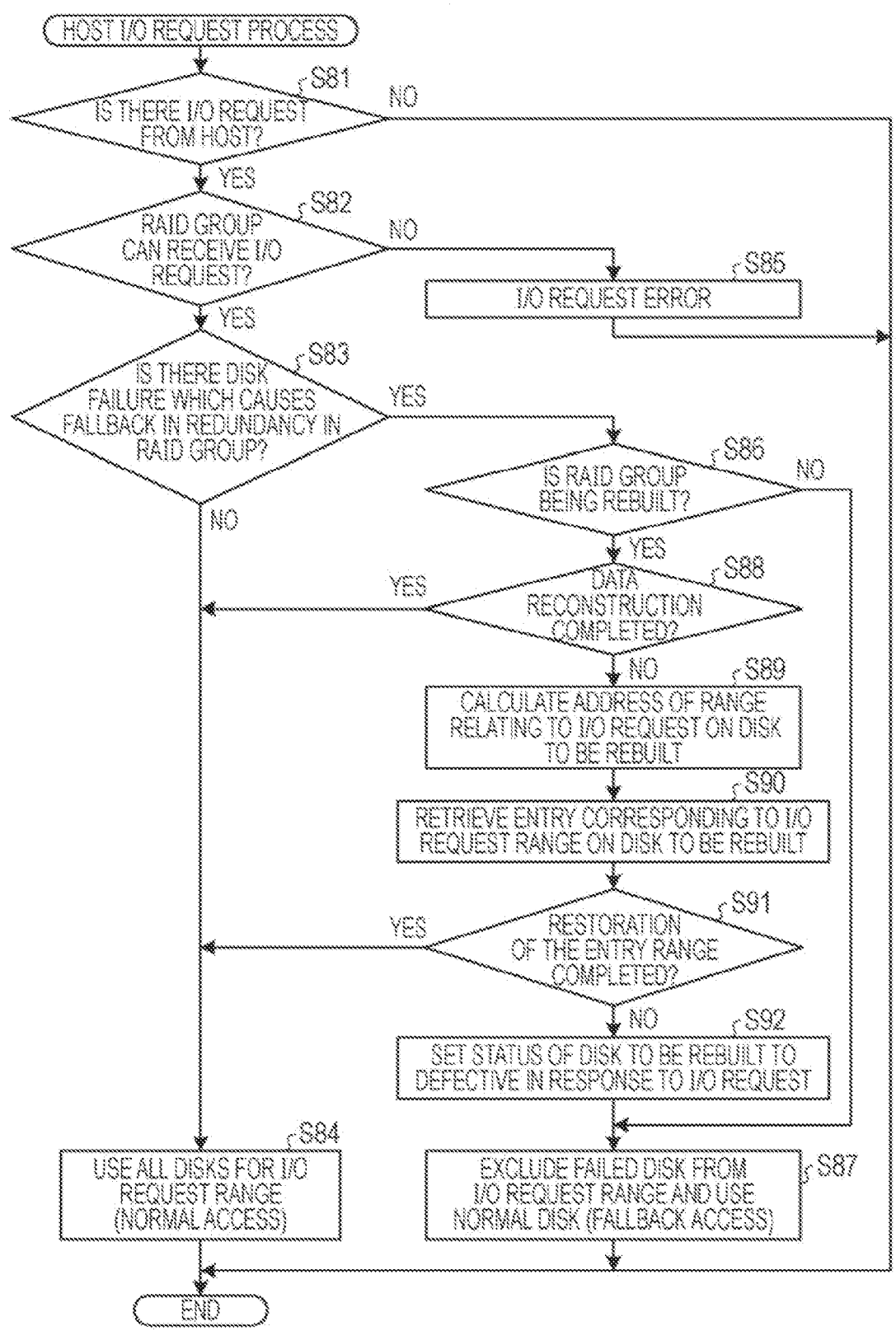
FIG. 13 is a flowchart of an operation of the RAID controller relating to a host I/O request process.
Figure 14:
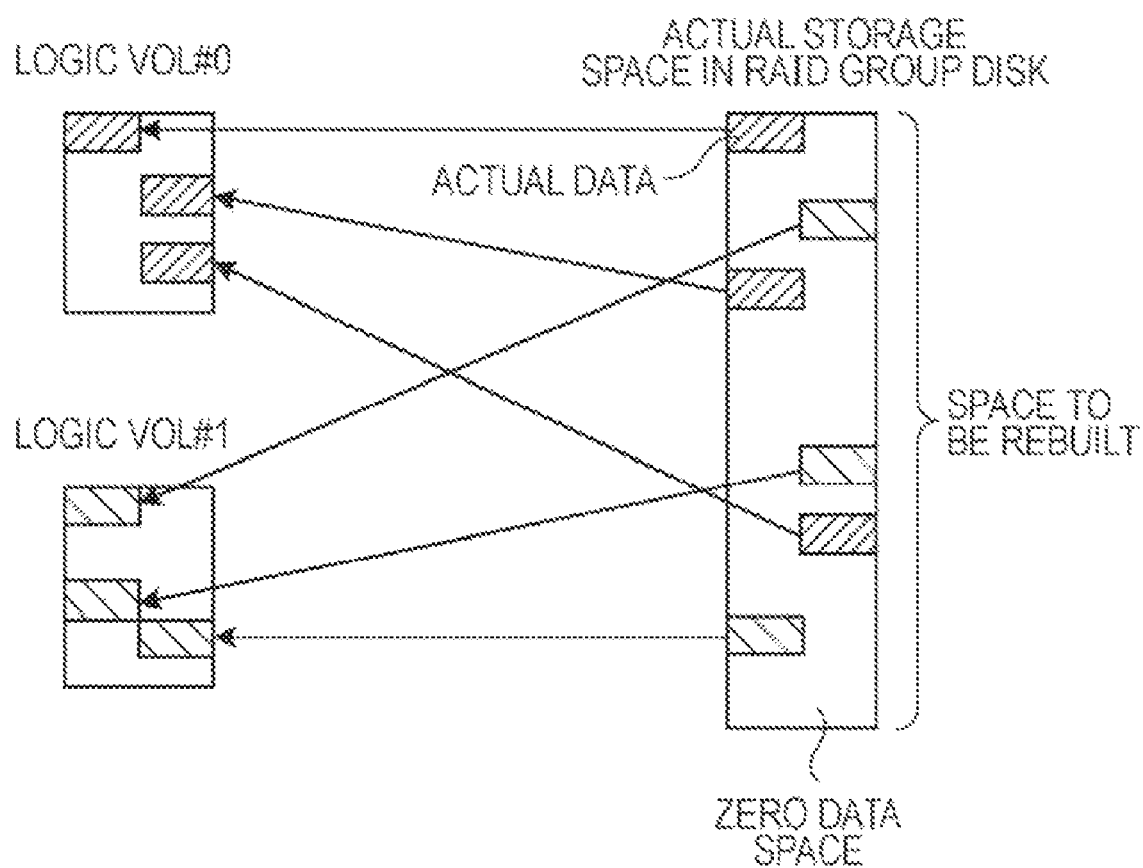
FIG. 14 illustrates a relationship between a logical storage space and an actual storage space of the RAID groups when a virtual volume is used.

FIG. 13 is a flowchart of an operation of the RAID controller 4 relating to a host I/O request process.

In FIG. 13, the control unit 43 in the RAID controller 4 determines whether an I/O request issued by the host 3 has been detected (step S81).

The I/O request is, for example, a write request for new data.

If the determination result in step S81 is YES, the control unit 43 determines whether the RAID group can receive an I/O request (step S82).

If the determination result in step S82 is YES, the control unit 43 determines whether there is a disk failure with which the RAID group has a fallback in redundancy (step S83).

If the determination result in step S83 is NO, the control unit 43 determines the status of the RAID group to "normal."

When the status of the RAID group is "normal," the control unit 43 performs normal access to the actual storage space relating to the logical storage space of the I/O request range using all the corresponding disks 5 (step S84) and completes the operation.

If the determination result in step S81 is NO, the control unit 43 completes the operation.

If the determination result in step S82 is NO, the control unit 43 the I/O request error to the host 3 (step S85) and completes the operation.

If the determination result in step S83 is YES, the control unit 43 determines whether the rebuild process for the RAID group is ongoing (step S86).

If the determination result in step S86 is NO, the control unit 43 determines the status of the RAID group to "fallback state."

If the determination result in step S86 is NO, the control unit 43 excludes the failed disk 5 and performs fallback access to normal disks 5 in the corresponding RAID group with respect to the actual storage space relating to the logical storage space in the range of the I/O request (step S87).

The control unit 43 then completes the operation.

If the determination result in step S86 is YES, the control unit 43 determines the status of the RAID group to "rebuild in fallback state."

When the rebuild process is ongoing, the control unit 43 determines whether the data reconstruction in the disk to be rebuilt (i.e., the destination disk) 5 with the ongoing rebuild process of the actual data has been completed (step S88).

If the determination result in step S88 is YES, the control unit 43 determines the status of the RAID group to "rebuild with only actual data recovered."

The process then proceeds to step S84 where the control unit 43 makes normal access upon completion of data reconstruction.

If the determination result in step S88 is NO, the control unit 43 determines the status of the RAID group to "rebuild in fallback state."

If the data reconstruction has not been completed, the control unit 43 calculates the block address corresponding to the logical storage space of the range of the I/O request in the disk 5 to be rebuilt (step S89).

The control unit 43 retrieves, from the logical storage space management table 54, the entry number which corresponds to the block address of the range of the I/O request in the disk 5 to be rebuilt (step S90).

If the entry number which corresponds to the block address of the range of the I/O request is retrieved, the control unit 43 determines whether the range of the retrieved entry number has been restored with reference to the restoration status bit (step S91).

If the determination result in step S91 is YES, the process proceeds to step S84 where the control unit 43 makes normal access.

If the determination result in step S91 is NO, the control unit 43 changes the status of the disk 5 to be rebuilt to "failed" (step S92).

When the status of the disk 5 to be rebuilt is changed to "failed," the process proceeds to step S87 where the control unit 43 makes normal access.

In the host I/O request process illustrated in FIG. 13, if an I/O request issued by the host 3 is detected when the status of the RAID group is "normal," normal access can be made to the corresponding disk 5 in the RAID group.

In the host I/O request process, if an I/O request issued by the host 3 is detected when the status of the RAID group is "rebuild with only actual data recovered," normal access can be made to the corresponding disk 5 in the RAID group.

In the host I/O request process, if an I/O request issued by the host 3 is detected when the status of the RAID group is "fallback state" or "rebuild in fallback state," fallback access can be made to the normal disk 5 in the RAID group to which the failed disk 5 belongs.

In the second embodiment described above, upon detection of the fallback in the data redundancy in the RAID group, actual data and parity of normal disks 5 other than the failed disk 5 in the RAID group to which the failed disk 5 belongs are read out.

In the second embodiment described above, the actual data in the stored space among the actual storage spaces of the failed disk 5 is restored with reference to the actual data and parity and the restored actual data is preferentially restored in the actual storage space in the destination disk 5.

Thus, in the second embodiment, even if a fallback occurs in data redundancy in the RAID group, the time required for the recovery of the data redundancy is shortened significantly and reliability in the data redundancy can be secured.

In the second embodiment described above, after the rebuild process to cause the actual data in the stored space to be restored in the destination disk 5 is performed, the zero data space in which the actual data has not been stored among the actual storage spaces of the failed disk 5 is preferentially restored in the actual storage space in the destination disk 5.

Thus, in the second embodiment, the actual data and the zero data space in the failed disk 5 can be completely restored in the destination disk 5.

In the second embodiment described above, new data can be stored in the actual storage space of an address subsequent to the stored space relating to the actual data for which the rebuild process has been performed even when the rebuild process for the actual data to destination disk 5 is ongoing.

In the second embodiment described above, when the new data is stored, the rebuild process is continued to cause the actual data in the stored space to be restored in the destination disk 5, including the actual data in the space in which the new data has been stored with reference to the management content of the logical storage space management table 54.

Thus, in the second embodiment, even if new data is written during the rebuild process of the actual data, the new data can also be restored in the actual storage space of the destination disk 5.

In the second embodiment described above, new data can be stored in the actual storage space corresponding to an address preceding the stored space relating to the actual data for which the rebuild process has been performed even during the rebuild process for the actual data to destination disk 5.

In the second embodiment described above, when new data is stored, the rebuild process is performed, after the ongoing rebuild process, to cause the actual data in the stored space in which the new data is stored to be restored in the destination disk 5 with reference to the management content of the logical storage space management table 54.

Thus, in the second embodiment, even if new data is written during the rebuild process of the actual data, the new data can also be restored in the actual storage space of the destination disk 5.

In the second embodiment described above, new data can be stored in the actual storage space in the disk 5 in the corresponding RAID group even during the zero guarantee rebuild process with respect to the destination disk 5.

In the second embodiment described above, when new data is stored, the ongoing zero guarantee rebuild process is suspended with reference to the management content of the logical storage space management table 54 and the rebuild process to preferentially cause the actual data in the stored space in which the new data is stored to be restored in the destination disk 5.

Thus, in the second embodiment, even if new data is written during the zero guarantee rebuild process, the new data can be restored in the actual storage space of the destination disk 5.

In the second embodiment described above, the allocation status bit representing whether the actual data has been allocated and the restoration status bit representing whether the rebuild process has been performed are managed in the logical storage space management table 54 for each stored space in the actual storage space and for each logical storage space corresponding to the space in which no data has been stored.

In the second embodiment described above, the space in which data has been stored, the stored space and the space which has been restored can be specified among the actual storage spaces in the disk 5 with reference to the allocation status bit and the restoration status bit in the logical storage space management table 54.

In the second embodiment described above, the zero guarantee rebuild process is performed when the zero data space in the failed disk 5 is restored in the destination disk 5.

Alternatively, however, the zero data space may be restored by partially formatting the corresponding actual storage space of the destination disk 5 upon restoration of the zero data space in the failed disk 5 with respect to the destination disk 5.

In the second embodiment described above, the zero guarantee area may be pooled in advance and the new data may be allocated to the pooled zero guarantee area upon detection of a write request for new data during the rebuild process.

Although the space in which no data, which is the initial data, is stored is the zero data space in the second embodiment described above, the initial data may be, for example, format data.

In the second embodiment described above, when new data is written in response to the write request for new data in the normal disks 5 other than the failed disk 5 in the corresponding RAID group during the zero guarantee rebuild process, the zero guarantee rebuild process is suspended.

The status of the corresponding RAID group is changed to "rebuild in fallback state."

However, the new data may be written in the destination disk 5 in the corresponding RAID group during the zero guarantee rebuild process in response to the write request for new data.

In this case, it is not necessary to change the status of the corresponding RAID group.

Although the RAID storage unit 1A with the RAID level of RAID5 is described as an example in the second embodiment, the second embodiment can also be applied to a RAID storage unit with the RAID level of RAID6.

The illustrated components of each section are not necessarily constituted physically as illustrated.

The specific form of distribution or integration of each section is not necessarily limited to those illustrated in the drawings; rather, the form may be entirely or partially distributed or integrated functionally or physically in an arbitrary unit in accordance with various loads or usage conditions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
   a plurality of physical media including actual storage spaces in each of which data is stored;
   a group control unit which creates a plurality of storage groups using the plurality of physical media;
   a virtual volume control unit which allocates, upon detection of a write request for new data in a virtual volume to be accessed, an actual storage space of a physical medium existing in the storage groups to the virtual volume in accordance with volume capacity of the new data;
   a storage control unit which causes the new data to be stored as actual data in the actual storage space of the physical medium allocated to the virtual volume by the virtual volume control unit and secures redundancy of the actual data with respect to the physical medium in the storage groups; and
   a restoration control unit which performs, upon detection of a fallback of redundancy with respect to the physical medium in the storage groups, a restoration process using the physical media other than the physical medium that caused the fallback in the storage groups to which the physical medium that caused the fallback belongs, such that the actual data in a stored space is preferentially restored in the actual storage space in the destination physical medium among the actual storage spaces in the physical medium that caused the fallback.

2. The storage device according to claim 1, wherein the restoration control unit performs, after the restoration process to cause the actual data in the stored space to be restored in the destination physical medium is completed, the restoration process to cause data in a space in which no actual data is stored to be restored in the actual storage space in the destination physical medium among the actual storage spaces in the physical medium which caused the fallback.

3. The storage device according to claim 1, wherein the restoration control unit performs, after the restoration process to cause the actual data in the stored space to be restored in the destination physical medium is completed, a formatting process to cause the actual storage space in the destination physical medium to be made a format for restoring the data in the space in which no actual data is stored, among the actual storage spaces in the physical medium which caused the fallback.

4. The storage device according to claim 1, wherein the restoration control unit continues, when the new data is stored in the actual storage space of an address subsequent to the stored space relating to the restored actual data during the restoration process to cause the actual data in the stored space to be restored in the destination physical medium, the restoration process to cause the actual data in the stored space to be restored in the destination physical medium, including the actual data in the stored space in which the new data has been stored.

5. The storage device according to claim 1, wherein the restoration control unit performs, when the new data is stored in the actual storage space of an address preceding the stored space relating to the restored actual data during the restoration process to cause the actual data in the space in which data has been stored to be restored in the destination physical medium, the restoration process to cause the actual data in the stored space in which the new data has been stored to be restored in the destination physical medium after the ongoing restoration process is completed.

6. The storage device according to claim 1, wherein when new data is stored in the actual storage space in the physical medium during the restoration process to cause data in a space in which no data is stored to be restored in the destination physical medium, the restoration control unit suspends the ongoing restoration process and preferentially performs a restoration process to cause the actual data in the stored space in which the new data has been stored to be restored in the destination physical medium.

7. The storage device according to claim 1, wherein the virtual volume control unit allocates, upon detection of the write request for the new data in the virtual volume to be accessed during the restoration process to cause data in the space in which no data is stored to be restored in the destination physical medium, the actual storage space of the physical medium secured beforehand.

8. The storage device according to claim 1, wherein the restoration control unit includes a status management unit which manages an allocation status representing whether the actual data has been allocated and a restoration status representing whether the restoration process has been completed for each stored space and for each space in which no data is stored, and the restoration control unit specifies, with reference to management content of the status management unit, the stored space, the space in which no data is stored and the space for which the restoration process has been completed among the actual storage spaces in the physical media.

9. A method for restoring data in a storage device, the method comprising:
   creating a plurality of storage group using a plurality of physical medium each having actual storage spaces in which data is stored;
   allocating, upon detection of a write request for new data in a virtual volume to be accessed, an actual storage space of a physical medium existing in the same storage group with the plurality of storage groups constituted by the plurality of physical media to the virtual volume in accordance with volume capacity of the new data;
   storing the new data as actual data in the actual storage spaces of the physical media allocated to the virtual volume to secure redundancy of the actual data with respect to the physical media in the storage group; and restoring preferentially, upon detection of a fallback of redundancy with respect to the physical medium in the storage group, the actual data to the actual storage space in the destination physical medium among the actual storage spaces in the physical medium that caused the fallback, with reference to a physical medium other than the physical medium that caused the fallback in the storage group to which the physical medium that caused the fallback belongs.

10. A storage controller comprising:

a group control unit which creates a plurality of storage groups using a plurality of physical media each having actual storage spaces in which data is stored;

a virtual volume control unit which allocates, upon detection of a write request for new data in a virtual volume to be accessed, an actual storage space of a physical medium existing in the storage groups to the virtual volume in accordance with volume capacity of the new data among a plurality of storage groups constituted by a plurality of physical media;

a storage control unit which causes the new data to be stored as actual data in the actual storage space of the physical medium allocated to the virtual volume by the virtual volume control unit and secures redundancy of the actual data with respect to the physical medium in the storage groups; and a restoration control unit which performs, upon detection of a fallback of redundancy with respect to the physical medium in the storage groups, the restoration process using the physical media other than the physical medium that caused the fallback in the storage groups to which the physical medium that caused the fallback belongs, such that the actual data in a stored space is preferentially restored in the actual storage space in the destination physical medium among the actual storage spaces in the physical medium that caused the fallback.

* * * * *